Feb. 21, 1939.                P. CRISSEY                2,148,399
                           EGG BEATER AND WHIP
                          Filed Aug. 17, 1936            3 Sheets—Sheet 1

Inventor
Paul Crissey
By Charles S. Wilson
Attorney

Inventor
Paul Crissey
By Charles J. Ochiron
Attorney

Patented Feb. 21, 1939

2,148,399

UNITED STATES PATENT OFFICE 2,148,399

EGG BEATER AND WHIP

Paul Crissey, Geneva, Ill., assignor to The Edward Katzinger Company, Chicago, Ill., a corporation of Illinois Application August 17, 1936, Serial No. 96,372

6 Claims. (Cl. 259—118)

This invention relates to kitchen utensils and especially to egg beaters and whips for the whipping of cream and beating of eggs. It has for its object the provision of a device of this character that will be simple and facile to operate, easily balanced and which will thoroughly act on the material being whipped or beaten at practically all points and at the same time stir it.

With the above and other objects in view, as will be apparent, this invention consists in the construction, combination and arrangement of parts, all as hereinafter more fully described, claimed and illustrated in the accompanying drawings, wherein:

Figure 1:
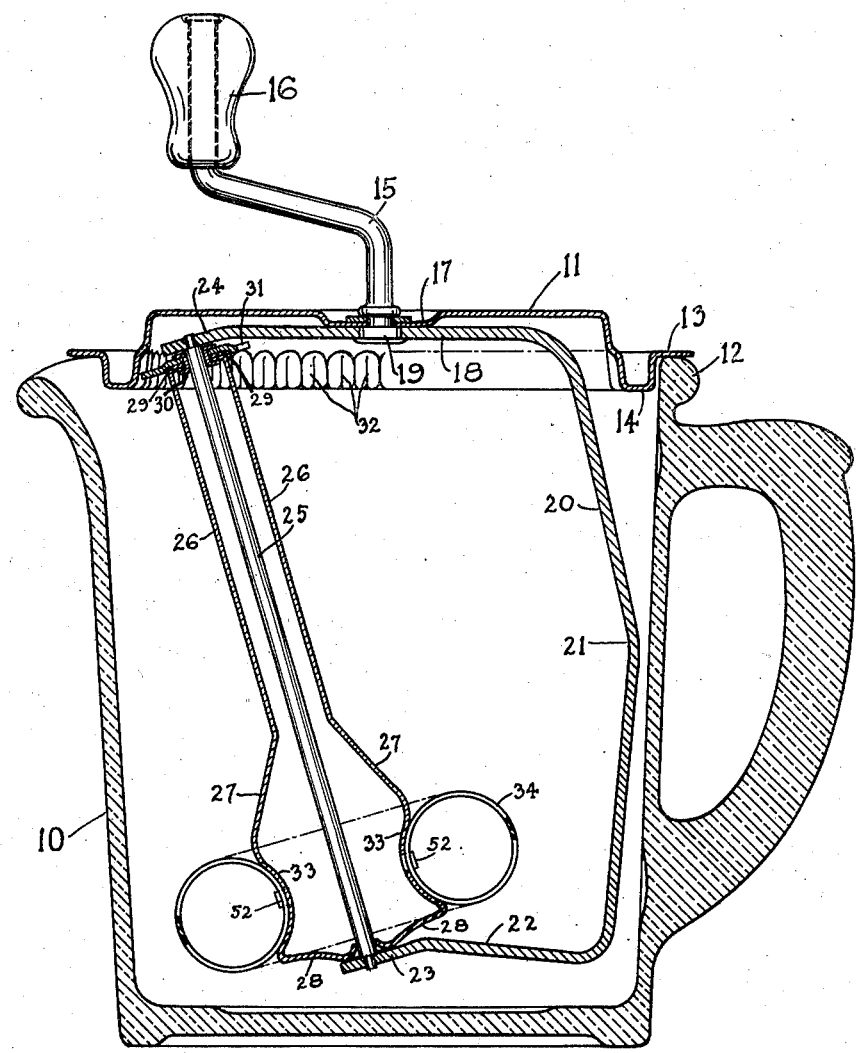
Fig. 1 is a vertical section through a container or receptacle illustrating the present device mounted for operation therein.

Heretofore, egg beaters and whips have fallen into either of two general types. The first of these types incorporates in its general construction a cover or lid for the receptacle in which the beater or whip is to operate and when the cover is placed upon the receptacle the beater mechanism occupies a bodily fixed position in the approximate center of the receptacle. A relatively long handle projects beyond the cover and is provided with a crank and gear by which the beater mechanism is operated within the receptacle. The length of the handle and position of the operating mechanism upon the exterior of the lid or cover tends to throw the beater or whip out of balance and frequently causes the receptacle and beater to tip. Furthermore, the beating or whipping mechanism of this type of device occupies a bodily fixed position within the receptacle and at the substantial center thereof causing the fluid or material being operated upon to eddy about the beater mechanism but does not cause the material or fluid adjacent the wall of the receptacle or in the corners between the bottom and wall of the receptacle to be more than incidentally agitated. In fact, in this general type of beater there is no stirring action causing an intimate intermingling of the whipped or beaten material.

Reference being had more particularly to the drawings, 10 designates a receptacle of any suitable style within which the beater is designed to operate. A lid or cover 11 is positioned above the lip 12 of the receptacle and is provided with an outstanding circumferential flange 13 below the plane of the lid or cover 11 to rest upon the edge or lip 12 of the receptacle 10. Between the flange 13 and the body 11 of the lid or cover there is formed a hollow bead 14 which extends into the receptacle 10 and is surrounded by its lip 12. Thus the cover 11 is seated on and within the mouth of the receptacle 10 with the hollow bead 14 thereof extending into the receptacle to prevent the cover or lid 11 from accidentally becoming displaced.

Figure 2:
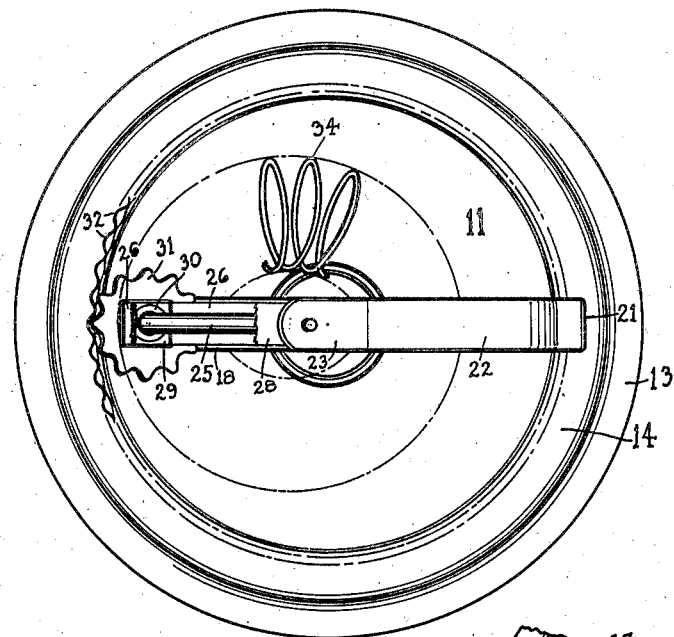
Fig. 2 is a bottom plan view of that form of the invention shown in Fig. 1.

In that form of the invention illustrated in Figs. 1 and 2 a crank 15 is mounted for rotation in a central bearing 17 in the cover or lid 11 and is provided with a handle 16 at its outer end by which the crank 15 may be freely and easily rotated. A frame arm 18 is positioned adjoining the inner face of the cover or lid 11 and is fixed to the inner end 19 of the crank 15 so that when the crank 15 is operated the frame arm 18 will be rotated in a plane substantially parallel to the body of the cover or lid 11 and within the space defined by the bead 14. At one of its ends the upper frame arm 18 is bent downwardly at an obtuse angle to form an upright 20 which is bent centrally of its length, as at 21, so that the lower portion thereof occupies a position substantially parallel to the wall of the receptacle 10. The lower end of the upright 20 is bent inwardly to rest approximately parallel to the upper frame arm 18 and to the bottom of the receptacle 10 with its terminal approximately in alignment with the inner end 19 of the crank 14, thereby forming a lower frame arm 22. At its extremity this lower frame arm 22 is disposed angularly to create a bearing and supporting member 23 for the lower end of the operating shaft 25 as will be hereinafter more fully described.

That end of the upper frame arm 18 opposed to the upright 20 is likewise bent angularly so that it rests substantially parallel to the lower bearing member 23, thereby creating an upper bearing member 24 for the shaft 25 of the beating mechanism.

Interposed between the two bearing members 23 and 24 is a shaft 25 carrying the beating mechanism. Mounted for rotation upon the shaft 25 is a beater frame consisting of two or more relatively narrow blades 26 arranged substantially or approximately parallel to the shaft 25 at the upper extremities and bowed outwardly in opposite directions, as at 27, adjoining their lower extremities. The ends of the bowed portions are bent inwardly, as at 28, and are secured for rotation to the lower end of the shaft 25 adjacent the bearing member 23. It is, of course, manifest that each pair of the blades 26 may be formed in one unitary piece whereby each end of the piece is positioned adjacent the upper end of the shaft 25, while the lower end of the shaft 25 passes through the transverse portion 28 thereof. Where more than two beater blades 26 are provided they will cross one another at a point adjacent the lower end of the shaft 25 and the lower end of the said shaft will pass through registering apertures therein.

At their upper ends the terminals of the beater blades 26 are bent inwardly, as at 29, to cross one another, where they are provided with registering apertures through which an eyelet rivet 30 passes. This eyelet rivet 30 also connects a spur gear 31 to the inwardly bent crossed ends 29 of the blades 26.

The inner face of the bead 14 adjoins the periphery of the spur gear 31 and is pressed to create a series of teeth 32 formed integrally therewith. These teeth mesh with the teeth of the spur gear 31. Therefore, as the crank 15 is rotated the entire frame made up of the upper and lower frame arms 18—22 and the upright 20 connecting them will also rotate and cause the gear 31 to travel about the inner surface of the bead 14. As its teeth mesh with the teeth 32 pressed from the inner surface of the bead 14, this spur gear 31 will likewise be rotated upon the shaft 25 causing the beater frame consisting of two or more blades 26 to rotate upon the shaft 25.

In this manner the beater frame consisting of two or more blades 26 rotates rapidly upon the shaft 25 while it is being carried bodily about the interior of the receptacle 10 by the frame consisting of the arms 18 and 22 and upright 20. Inasmuch as the lower frame arm 22 is shorter than the upper frame arm 18, the shaft 25 and the beater frame is disposed at an angle to the bottom of the receptacle 10.

The opposed and outwardly curved lower portions 27 of the blades 26 are medially bent inwardly to create a pocket 33 in each blade. These pockets 33 are aligned transversely of the shaft 25 one with the other. An annular beater element 34, cylindrical in cross-section, encircles the oppositely and outwardly curved lower ends 27 of the blades 26 and is seated in the pockets 33. This beater element comprises a continuous annular and cylindrical wire coil of a uniform diameter and when seated in the pockets 33 provided therefor projects laterally from the beater blades and is positioned at an angle to the bottom of the receptacle 10.

From the foregoing, it is apparent that as the crank 15 is rotated, the carrying frame consisting of the upper and lower frame arms 18—22 and upright 20, will be rotated within the receptacle thereby stirring the contents thereof. Simultaneously the beater frame consisting of the blades 26 will be rotated relatively to the carrying frame aforesaid and will also be transported bodily by said carrying frame about an orbit within the receptacle 10. This movement causes the laterally disposed relatively large beater element 34 to act upon and come in close, intimate contact with all portions of the mass of fluid within the receptacle.

Figure 3:
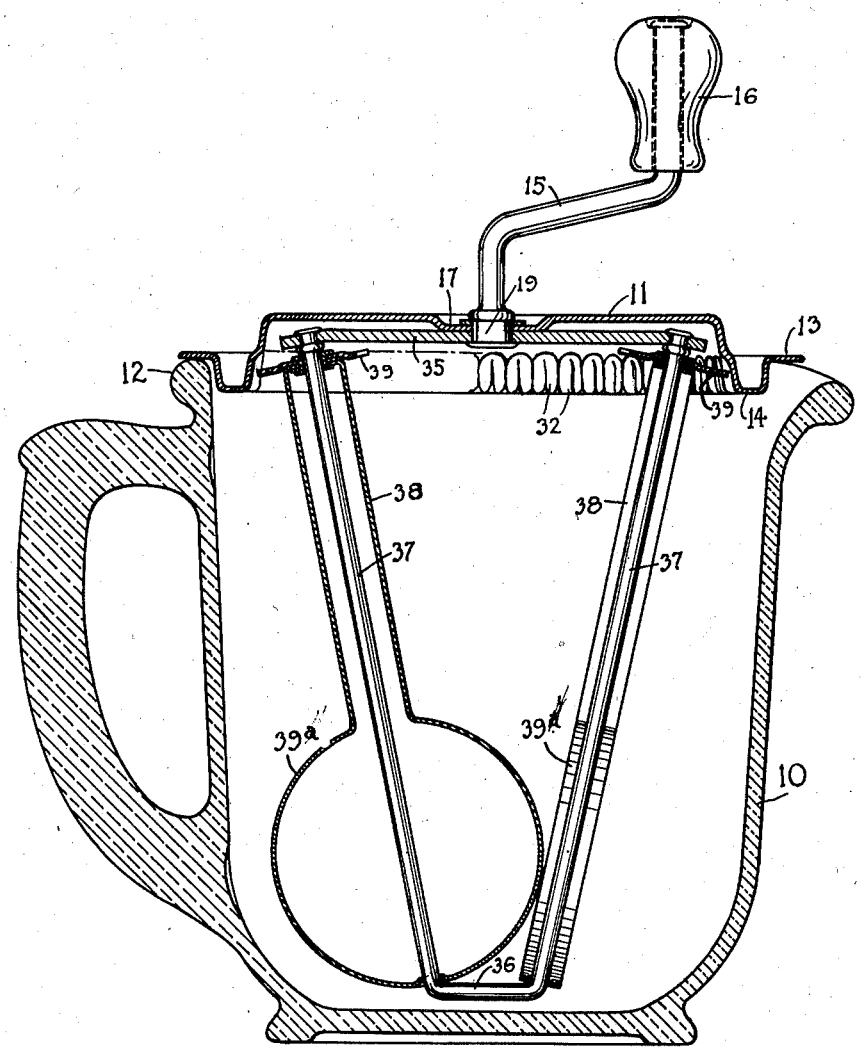
Fig. 3 is a vertical section through a container or receptacle disclosing a modified form of the present invention mounted for operation therein.

In Fig. 3 is illustrated a form of beater somewhat different from that shown in Figs. 1 and 2. In this form of the invention, the cover or lid 11 is similar in construction to the cover or lid 11 heretofore described and the inner face of the bead 14 thereof is provided with the teeth 32. The inner end 19 of the crank 15 is connected to a transversely disposed arm 35 which like the arm 18, rests parallel to and beneath the body of the cover 11. A carrying frame consisting of a relatively narrow base 36 adapted to be positioned adjoining the bottom of the receptacle 10 and a pair of divergent arms 37 is fixed to this arm 35 by having the terminals of its divergent arms 37 secured to the extremities thereof. A beater frame 38 is mounted upon each of the divergent arms 37 and has a gear 39 fixed to its upper end to mesh with the teeth 32 of the bead 14. The beater frames are generally constructed like the beater frames heretofore in use and when they rotate their enlarged lower extremities 39a interlock or travel in crossing paths. It is apparent from the foregoing that as the crank 15 is rotated the arm 35 will likewise be rotated in a plane parallel to the cover or lid 11 thereby bodily rotating the carrying frame consisting of the base portion 36 and the divergent arms 37 within the receptacle 10. Simultaneously with this bodily rotation of the carrying frame within the receptacle 10 the beater frames 38 will be rotated upon their respective arms 37. Thus, the beating elements 39 of the frames 38 will be carried to and through all portions of the mass of liquid being treated.

Figure 4:
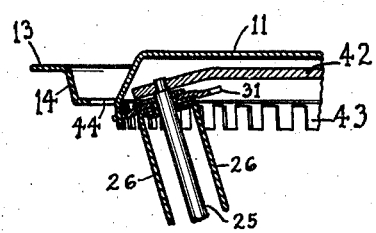
Fig. 4 is a fragmentary section through a lid for a receptacle in which the present invention is designed to operate illustrating a modification of the operating mechanism and its cooperation with the beater elements.

In Fig. 4 is illustrated a still further modification of the means whereby the beater frames 26 and/or 38 may be rotated. In this form of the invention the arm 42 is the equivalent of either the upper frame arm 18 in that form of the invention illustrated in Figs. 1 and 2, or the arm 35 of that form of the invention illustrated in Fig. 3. In this form of operating mechanism, the shaft 25 or its equivalent, the divergent arms 37, of that form of the invention illustrated in Fig. 3 is mounted at the extremities of the arm 42 providing a mounting for the beater frame 26 to which is attached the usual gear 31. The teeth 43 for the operation of the beater gears 31 upon the rotation of the frame arm 42 are formed from the bottom of the bead 14 and are bent to rest at an angle to the bottom of the bead for meshing with the teeth of the gear 31. This will leave a series of openings 44 in the bottom of the bead. The beater frame 26 is rotated upon the shaft 25 and is transported bodily by the movement of the frame arm 42.

Figure 5:
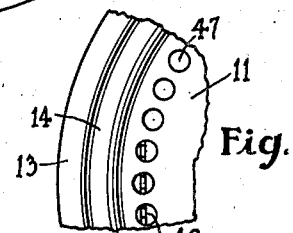
Fig. 5 is a fragmentary plan view of the lid which carries the present beater or whip illustrating a modified construction thereof.
Figure 6:
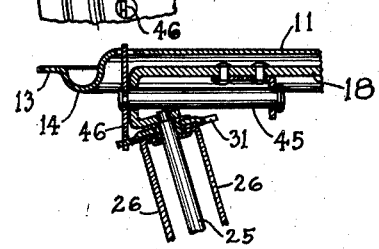
Fig. 6 is a sectional view of that form of the invention disclosed in Fig. 5.

In Figs. 5 and 6 the frame arm 18 is provided at its end with a parallel stub shaft 45 at the outer end of which is a spur gear 46, the teeth of which mesh with a series of openings 47 formed in the body of the cover 11 adjoining the bead 14. The teeth of the gear 46 also mesh with the teeth of the gear 31 carried by the beater frame 26. Thus, as the upper frame arm 18 is rotated by the crank 15, as above described, the gear 46 will travel about the interior of the cover 11 and will be rotated by having its teeth successively enter the apertures 47 in the cover. This will cause the beater frame 26 to rotate and be bodily transported as above described.

From the foregoing it is manifest that the present invention provides an entirely different style and type of beater element, to-wit: a cylindrical annular beater element formed from a wire coil and so mounted on the beater frames that it is positioned transversely thereof. This increases the area operated upon by the beater element irrespective of the type of mechanism by which it is operated.

Furthermore, the present beater constantly stirs the fluid or material being treated and moves the beater bodily there-through while it is being rotated. This brings all parts of the liquid material into contact with the beater and produces much quicker results than otherwise obtainable.

What is claimed is:

1. A beating and whipping apparatus comprising a receptacle, a sheet metal cover therefor, alternate depressions and elevations stamped in said cover, a carrying frame adapted to be contained in said receptacle, a beater frame mounted for rotation in said carrying frame, a gear secured to said beater frame and meshing with said depressions and elevations in the cover, and means for rotating said carrying frame whereby the beater frame will be rotated relatively to the carrying frame as the latter rotates including a shaft having bearing support in said cover and through which said carrying frame is suspended in spaced relation to the bottom of the receptacle.

2. A beating and whipping apparatus comprising a receptacle, a cover therefor, an annular bead extending downwardly from the underside of said cover and presenting an inwardly directed face or edge, and an outwardly directed face or edge for abutment with the inner lip portion of said receptacle, a carrying frame mounted for rotation relative to said cover, a beater frame mounted in said carrying frame for rotation relatively thereto, and means including teeth formed on the inwardly directed face of said annular bead in the cover aforesaid for simultaneously rotating said frames.

3. A beating and whipping apparatus comprising a receptacle, a cover therefor, an annular bead extending downwardly from said cover and presenting an inwardly directed face or edge and an outwardly directed face or edge for abutment with the inner lip portion of said receptacle, a carrying frame mounted for rotation relative to said cover, a beater frame mounted in said carrying frame for rotation relatively thereto, teeth formed on the inwardly directed face of said annular bead in the cover aforesaid, and a gear secured to said beater frame and meshing with said teeth on the bead whereby the said beater frame will be rotated relatively to the carrying frame as the latter rotates.

4. A beating and whipping apparatus comprising a receptacle, a cover therefor, an annular bead extending downwardly from said cover and presenting an inwardly directed face or edge and an outwardly directed face or edge for abutment with the inner lip portion of said receptacle, a carrying frame adapted to be contained in said receptacle and having vertically spaced bearings in a plane oblique to the vertical axial center of the receptacle, a beater frame including a shaft mounted for rotation in said bearings, teeth formed on the inwardly directed face of said annular bead in the cover aforesaid, a gear secured to said beater frame and meshing with said teeth on the bead whereby the said beater frame will be rotated relatively to the carrying frame as the latter rotates.

5. A beating and whipping apparatus comprising a receptacle, a cover therefor, an annular bead extending downwardly from said cover and presenting an inwardly directed face or edge and an outwardly directed face or edge for abutment with the inner lip portion of said receptacle, a carrying frame adapted to be contained in said receptacle and having vertically spaced bearings in a plane oblique to the vertical axial center of the receptacle, a beater frame including a shaft mounted for rotation in said bearings, teeth formed on the inwardly directed face of said annular bead in the cover aforesaid, a gear secured to said beater frame and meshing with said teeth on the bead whereby the said beater frame will be rotated relatively to the carrying frame as the latter rotates, and means for rotating said carrying frame including a shaft having bearing support in said cover and through which said carrying frame and beater frame are suspended in spaced relation to the bottom of the receptacle.

6. A beating and whipping apparatus comprising a receptacle, a sheet metal cover therefor, alternate depressions and elevations stamped in said cover, a carrying frame adapted to be contained in said receptacle and providing vertically spaced bearings in a plane oblique to the vertical axial center of the receptacle, a beater frame including a shaft mounted in said bearings and defining an axis for rotation of said beater relative to said carrying frame, a gear secured to said beater frame and meshing with said depressions and elevations in the cover, and means for rotating said carrying frame for bodily moving said beater frame.

PAUL CRISSEY.